(12) United States Patent
Glatt

(10) Patent No.: US 7,768,545 B2
(45) Date of Patent: Aug. 3, 2010

(54) PANORAMIC IMAGE MANAGEMENT SYSTEM AND METHOD

(76) Inventor: Otto Gregory Glatt, 4 Crown Point, Ballston Lake, NY (US) 12019

( * ) Notice: Subject to any disclaimer, the term of this patent is extended or adjusted under 35 U.S.C. 154(b) by 148 days.

(21) Appl. No.: 12/035,404

(22) Filed: Feb. 21, 2008

(65) Prior Publication Data

US 2008/0218587 A1  Sep. 11, 2008

Related U.S. Application Data

(60) Provisional application No. 60/893,359, filed on Mar. 6, 2007, provisional application No. 60/986,584, filed on Nov. 8, 2007.

(51) Int. Cl.
*H04N 7/00* (2006.01)
(52) U.S. Cl. ...................................................... 348/36
(58) Field of Classification Search ........................ None
See application file for complete search history.

(56) References Cited

U.S. PATENT DOCUMENTS

| | | | |
|---|---|---|---|
| 5,373,392 A * | 12/1994 | Bala | 359/241 |
| 5,869,855 A | 2/1999 | Yoon et al. | |
| 6,051,836 A * | 4/2000 | Kirihata et al. | 250/353 |
| 6,449,103 B1 * | 9/2002 | Charles | 359/725 |
| 6,594,488 B1 | 7/2003 | Herman et al. | |
| 7,044,614 B2 | 5/2006 | Levy et al. | |
| 7,071,451 B2 * | 7/2006 | Ishikawa et al. | 250/201.4 |
| 7,242,425 B2 | 7/2007 | Driscoll, Jr. et al. | |
| 2007/0139792 A1 * | 6/2007 | Sayag | 359/739 |
| 2007/0259117 A1 * | 11/2007 | Archey et al. | 427/337 |

FOREIGN PATENT DOCUMENTS

WO    WO03046632    6/2003

* cited by examiner

*Primary Examiner*—Nhon T Diep
(74) *Attorney, Agent, or Firm*—Michael R. Kahn

(57) ABSTRACT

A panoramic image management system and method is disclosed. The system provides for improved calibration of a 360 degree panoramic camera, as well as improved means for manipulating the images, and correlating images from conventional video cameras with the images from the 360 degree panoramic camera. The system also provides means for archiving and retrieving stored images. The present invention contributes to an improved video surveillance system.

15 Claims, 21 Drawing Sheets

| Controls ⊠ | |
|---|---|
| ACTION | KEY |
| Standard Mode | |
| Stretch X + | E |
| Stretch X - | D |
| Crop Top + | Y |
| Crop Top - | H |
| Crop Bottom + | U |
| Crop Bottom - | J |
| Setup Mode | |
| Scale X + | Q |
| Scale X - | A |
| Scale Y + | W |
| Scale Y - | S |

800

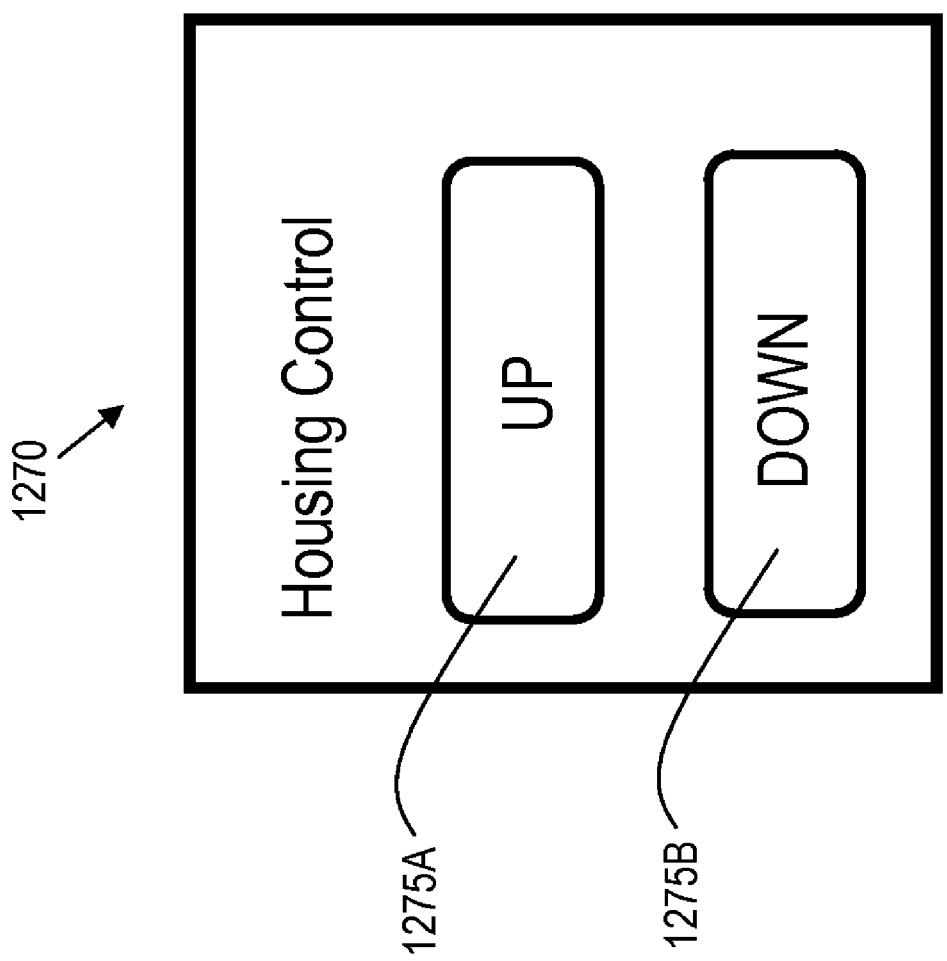

PANORAMIC IMAGE MANAGEMENT SYSTEM AND METHOD

CROSS REFERENCE TO RELATED APPLICATIONS

This application claims benefit to U.S. Provisional Application Ser. No. 60/893,359, filed on Mar. 6, 2007, and U.S. Provisional Application Ser. No. 60/986,584, filed on Nov. 8, 2007, the disclosures of which are incorporated herein by reference.

FIELD OF THE INVENTION

The present invention generally pertains to surveillance systems. More particularly, the present invention pertains to imaging systems for the panoramic surveillance of a space using a single, stationary camera.

BACKGROUND

Panoramic cameras provide a convenient way to capture a 360 degree field of view with a single camera. Cameras of this type are very useful for surveillance and security applications. Such a system is disclosed in U.S. Pat. No. 7,071,964 (360-Degree Panoramic Scene-Storage Device), and is incorporated herein by reference. The images acquired from such a camera usually require additional image processing to provide a dewarped "rectangular" image that is more easily viewed by a human. As there is an ever increasing need for security and surveillance, it is desired to have an improved system and method for the handing of panoramic images.

SUMMARY OF THE INVENTION

One aspect of the invention provides for viewing a still image and a moving video image simultaneously on the same screen.

Another aspect of the invention provides viewing a circular image and a rectangular rendering of the image simultaneously.

Yet another aspect of the invention provides a method for allowing a user to perform a camera calibration by placing the cursor over the desired point in the circular image, to provide calibration for the dewarping to the rectangular image.

Yet another aspect of the invention provides for horizontally shifting the rectangular image, such that any viewing angle may be viewed in the center of the screen, and corresponding adjustment of the angular indication to correlate to the horizontally shifted image.

Yet another aspect of the invention provides for quickly resetting the aforementioned horizontally shifted rectangular image, such that the original viewing angle may be quickly restored.

Yet another aspect of the invention provides compensation for various configurations of curved reflectors.

Yet another aspect of the invention provides for correlating a device to a point identified on the rectangular image. The device may be a regular camera, or a weapon, such as a machine gun, missile, or torpedo.

Yet another aspect of the invention provides for performing a convenient means for a double flip of the image. The double flip comprises flipping the image about both the horizontal axis and vertical axis, and is a convenient feature for rectifying images captured from an inverted camera.

Yet another aspect of the invention provides for quick retrieval of video footage based on an approximate time of interest. This is accomplished by managing date and time of the archived video files with a desired time range.

Yet another aspect of the invention provides for selecting one or more different storage destinations for saving the video data. These storage destinations may include, but are not limited to, a hard disk, flash storage, USB memory device, or a networked device, such as another computer.

Yet another aspect of the invention provides for a spot magnifier feature. This allows an area of interest within a video stream or still image to be conveniently magnified for closer inspection.

Yet another aspect of the invention provides for an operator to control a retractable photochromic housing. This allows the housing to be cleaned or secured when not in use.

Yet another aspect of the invention provides for saving the calibration data pertinent to an individual camera assembly. Software operating in an embodiment of the present invention can manage various offsets to compensate for manufacturing differences in a particular camera assembly. This data includes, but is not limited to, data regarding centering of the image, as well as exposure control information.

Yet another aspect of the invention provides the ability to view a panoramic image from a panoramic camera, and simultaneously control a plurality of conventional video cameras (i.e., cameras that are not 360 degree panoramic cameras), allowing an operator to get a close-up look at an area or particular object of interest indicated on the panoramic image.

Yet another aspect of the invention provides the ability to configure a device in accordance with the present invention for a variety of input sources, including, but not limited to, USB, IEEE-1394, Video over IP, CAN, LAN, WAN, and PAN.

Yet another aspect of the invention provides the ability to provide for multi-stage archival of data. For example, video may be saved to local non-volatile memory, and then transferred to a hard disk for long term storage, at which point the local non-volatile memory may be reused for new video footage.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting.

In the drawings accompanying the description that follows, in some cases both reference numerals and legends (labels, text descriptions) may be used to identify elements. If legends are provided, they are intended merely as an aid to the reader, and should not in any way be interpreted as limiting.

FIG. 12C shows a user interface for controlling a retractable camera housing.

DETAILED DESCRIPTION

Figure 1:
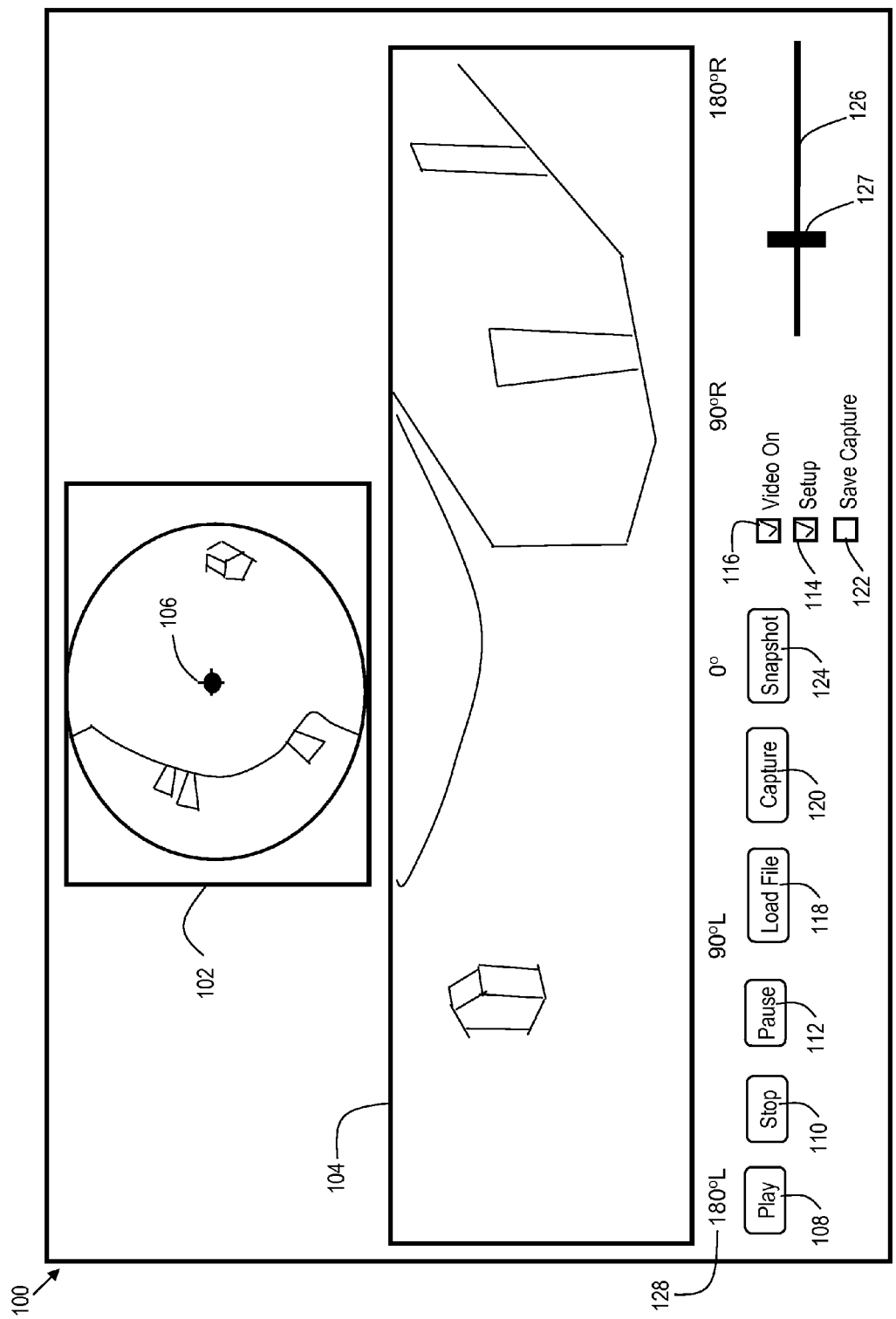
FIGS. 1-3 illustrate various steps of the setup process.

FIG. 1 shows an exemplary embodiment of the present invention during the setup process. The user interface (UI) 100 is implemented in software executing on a computer system (see 1540 of FIG. 15) that receives and processes image input from a 360 degree panoramic video camera. The computer system has storage means (see 1544 of FIG. 15), such as a hard disk, or other form of non-volatile memory for storing images captured from the 360 degree panoramic camera. See FIG. 1 of U.S. Pat. No. 7,071,964 for a block diagram of an exemplary system. The user interface 100 provides a circular video view 102 and a rectangular video view 104. The video from circular video view 102 is converted to a rectangular format and displayed in rectangular video view 104. For accomplishing the setup, the rectangular video view 104 shows the same image data from the circular video view 102, but using image processing techniques to "dewarp" the video. There are various dewarping algorithms known in the art which can be used for this purpose. Associated with the rectangular video view 104 is degree indicator 128. This indicates the orientation relative to a given direction from the circular video view 102. The circular video view 102 image is received from a 360 degree panoramic camera (not shown), preferably of the convex reflector variety. An arbitrary point along the circumference of the 360 degree panoramic camera is chosen as 0 degrees. The other degree indications shown (e.g. 90 degrees Left, 90 degrees Right, etc. . . . ) are relative to the chosen 0 degree point. The 0 degree point is preferably chosen as the point towards which the camera moves forward.

Additional controls shown in FIG. 1 include play control 108, which starts playback of a saved video file, stop control 110, which stops playback of a saved video file, and pause control 112, which pauses playback of a video file. The Video On checkbox 116 causes the rectangular video view 104 to be displayed when checked. The setup checkbox 114 causes the circular video view 102 to be displayed when checked. This is used for the calibration method of the present invention. The load file control 118 invokes a file selection dialog box (not shown), that allows a user to select a previously saved video capture file for viewing. The capture control 120 selects video from a 360 degree panoramic camera that is connected to the computer system.

The save capture checkbox 122 causes the captured video to be automatically stored within the computer system. In a preferred embodiment, the captures are organized into a plurality of video files, each containing a predetermined amount of data. Once the predetermined amount of data has been reached, the current file is closed, and subsequent data is saved to a new file. In this way, a "looped" system is in place, wherein once a predetermined number of files have been created, the oldest file is deleted and overwritten with new data. In a preferred embodiment there is sufficient storage capacity for several hours of video data available for later viewing.

The Snapshot control 124 causes the current video frame to be stored as a separate still image on the computer system. The slider control 126 provides the user with the capability to quickly access any part of a saved video file by adjusting the slider 127 of the slider control to the desired location.

Figure 1B:
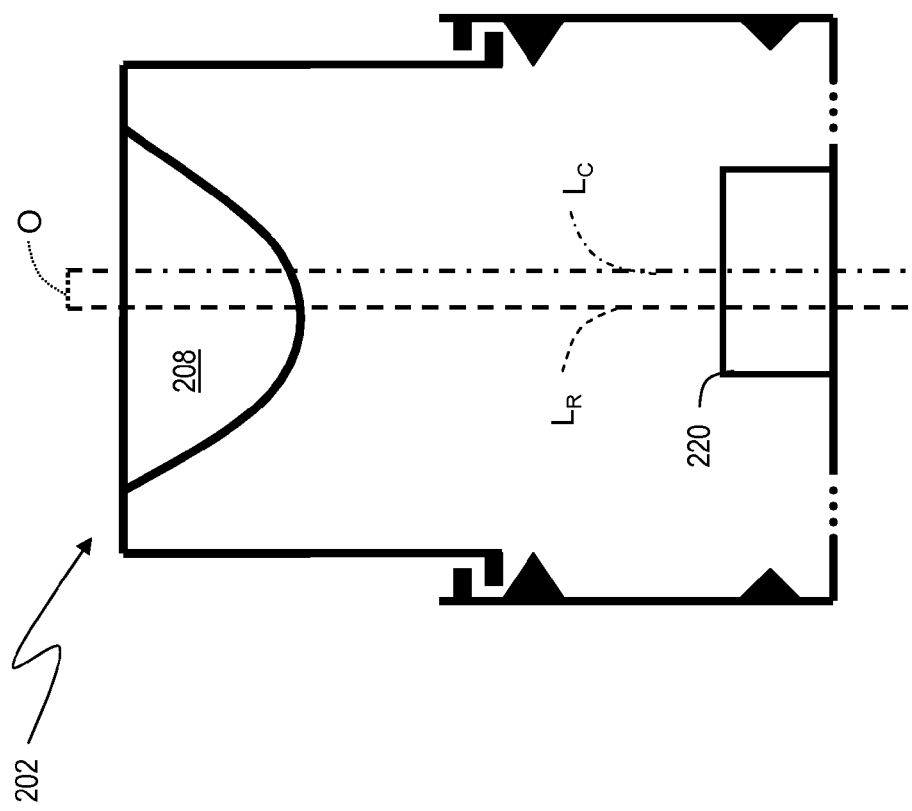

Within circular video view 102 is cursor 106. Cursor 106 is manipulated by the user via a pointing device (device capable of manipulating a cursor), such as a mouse, keyboard, trackball, joystick, or other suitable input device. The cursor 106 is used to denote an offset of the convex reflector to the image capture element (e.g. CCD chip) of the 360 degree panoramic camera. See FIG. 2 of U.S. Pat. No. 7,071,964 for a diagram of an exemplary 360 degree panoramic camera. In that figure, the convex reflector is indicated as 208, and the image capture element is indicated as 220. Ideally, the convex reflector is perfectly aligned with the center of the image capture element. However, in a practical sense, due to errors and tolerances within the manufacturing process, the alignment of the convex reflector and image capture element may not be perfect. This is shown in FIG. 1B, wherein the panoramic camera 202 has the convex reflector is indicated as 208, and the image capture element is indicated as 220. Line $L_R$ represents the centerline of convex reflector 208, and line $L_C$ represents the center line of image capture element 220. Ideally, lines $L_C$ and $L_R$ should overlap. However, in practice, they are often separated by offset O, due to part tolerances and variations in the manufacturing process. Without compensation for this offset, the result is a "warped" rectangular image, as indicated in rectangular video view 104.

Figure 2:
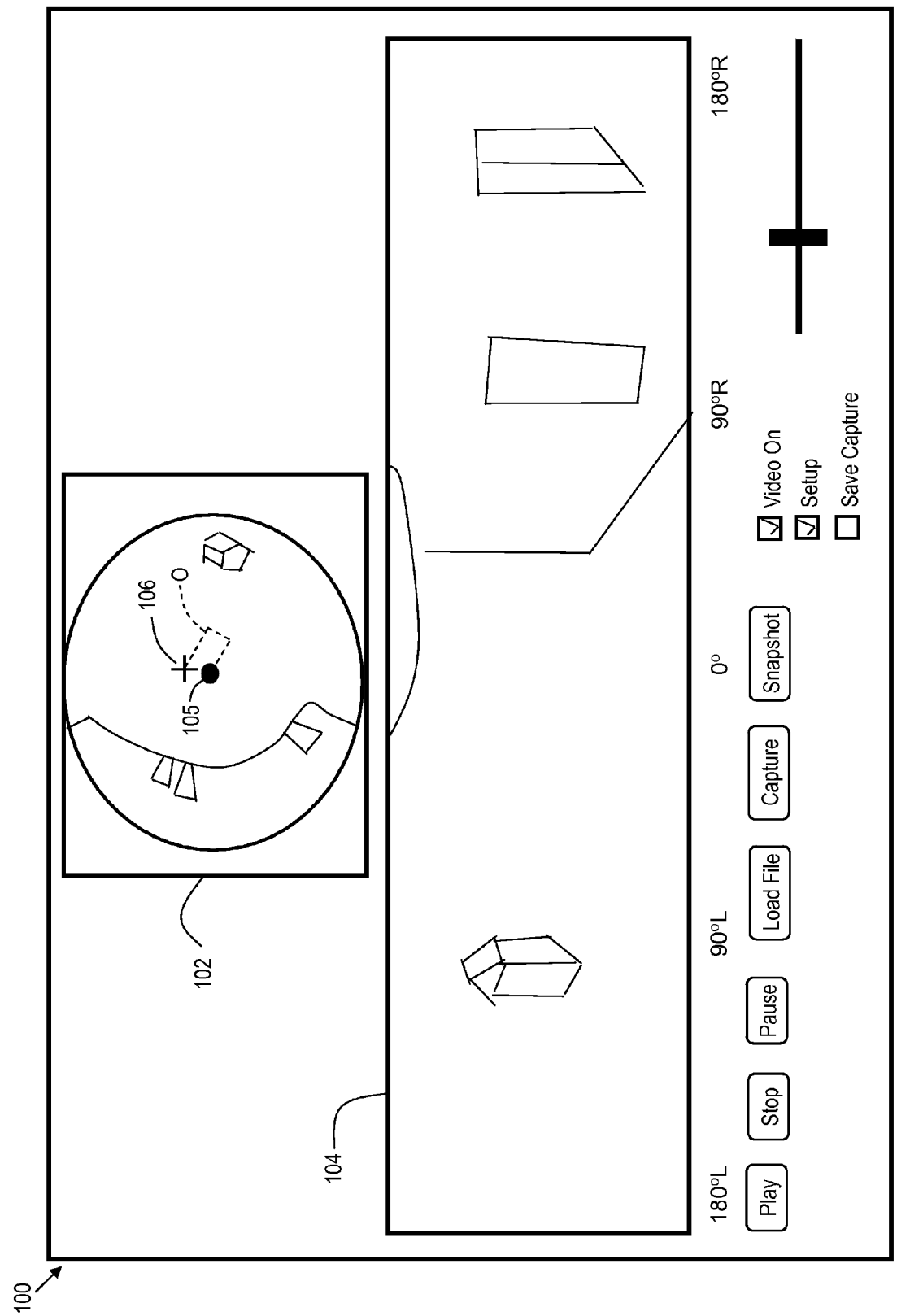

FIG. 2 shows an additional view of the present invention during the setup process. In this view, the cursor 106 has been moved from its position in FIG. 1. The new position of cursor 106 represents an offset O which is the difference between the center point 105 of the convex reflector and the center point of the image capture element (see 220 of FIG. 1B). In one embodiment, the cursor is moved via a mouse, and once the cursor 106 is in the desired position, the user then records the position by clicking a mouse button. This offset O is applied to the dewarping algorithm to regenerate the dewarped rectangular image in rectangular video view 104. Offset O is stored in a non-volatile storage location (e.g. hard disk, or flash memory), thereby saving the calibration information. Therefore the operation shown in FIG. 2 need not be performed every time the system is used, but only needs to be performed during the initial setup of the system.

Figure 3:
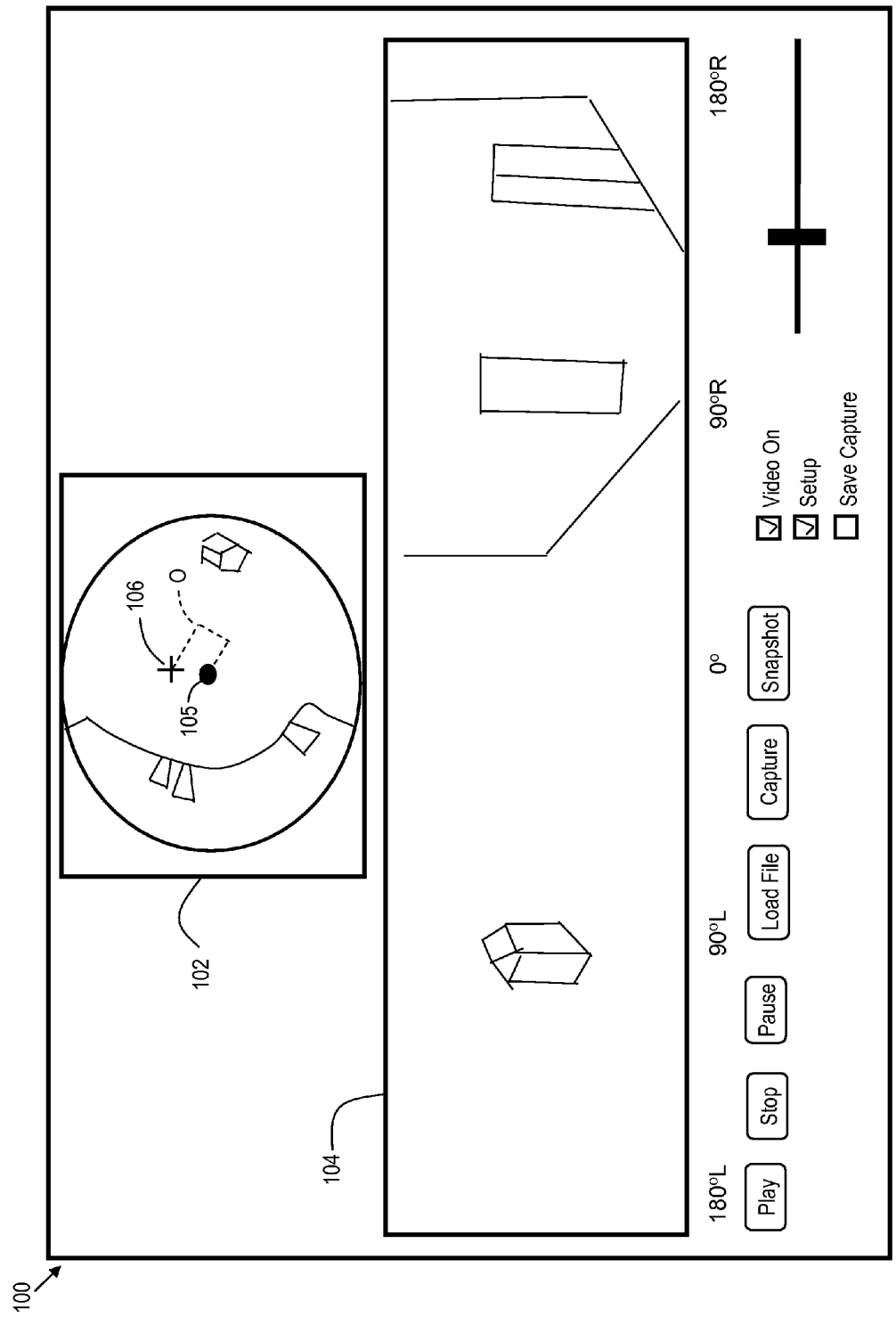

FIG. 3 shows an additional view of the present invention during the setup process with the cursor 106 moved from its position in FIG. 2. In this figure, the rectangular video view 104 shows corrected dewarped video, based on the offset value corresponding to the position of cursor 106 from the center point 105.

Figure 4:
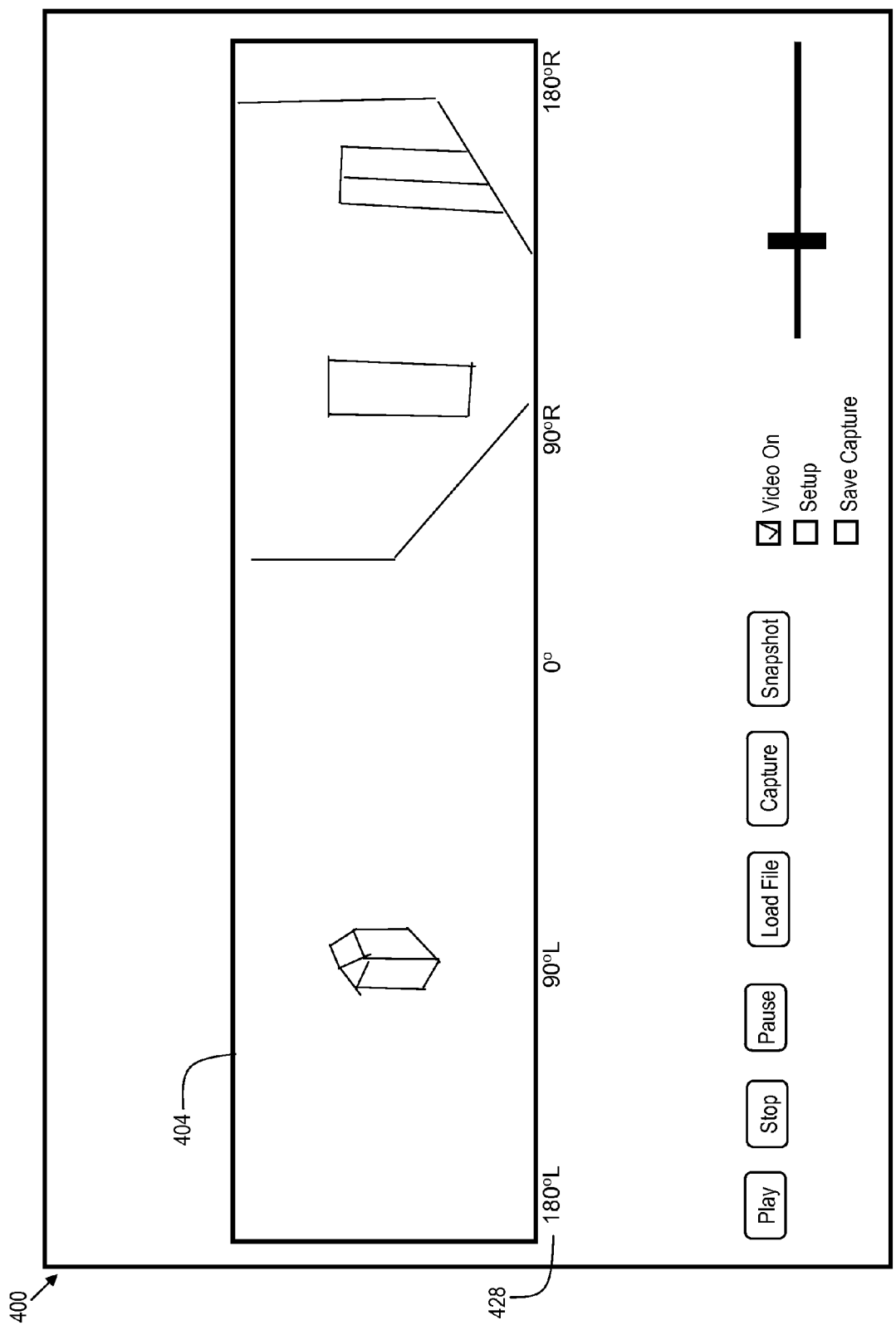
FIG. 4 shows an embodiment with a single rectangular video view.

FIG. 4 shows an additional view 400 of the present invention during the surveillance process. In this case, the setup is complete, and the circular video view 102 has been removed from the display. This allows the operator to focus on the rectangular video view 104 without having distractions from an additional view.

Figure 5:
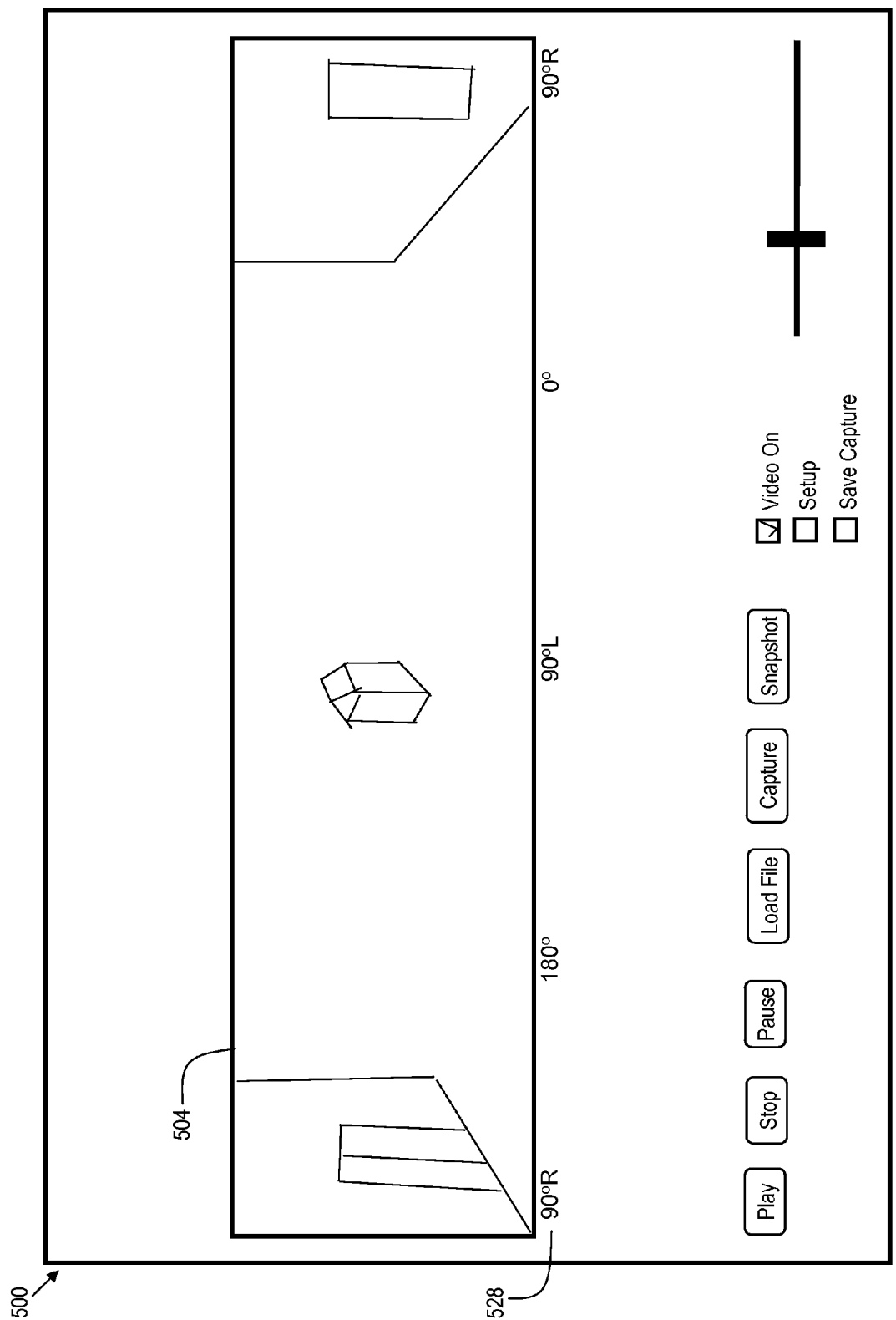
FIG. 5 shows an embodiment with a single rectangular video view that has been horizontally shifted.

FIG. 5 shows an additional view 500 of the present invention during the surveillance process. In this case the rectangular video view has been shifted 90 degrees (i.e., 90 degrees of positional shift have been applied). The degree indicator 528 is now shifted (compare with degree indicator 428 of FIG. 4), to properly indicate the shifted image.

Figure 6:
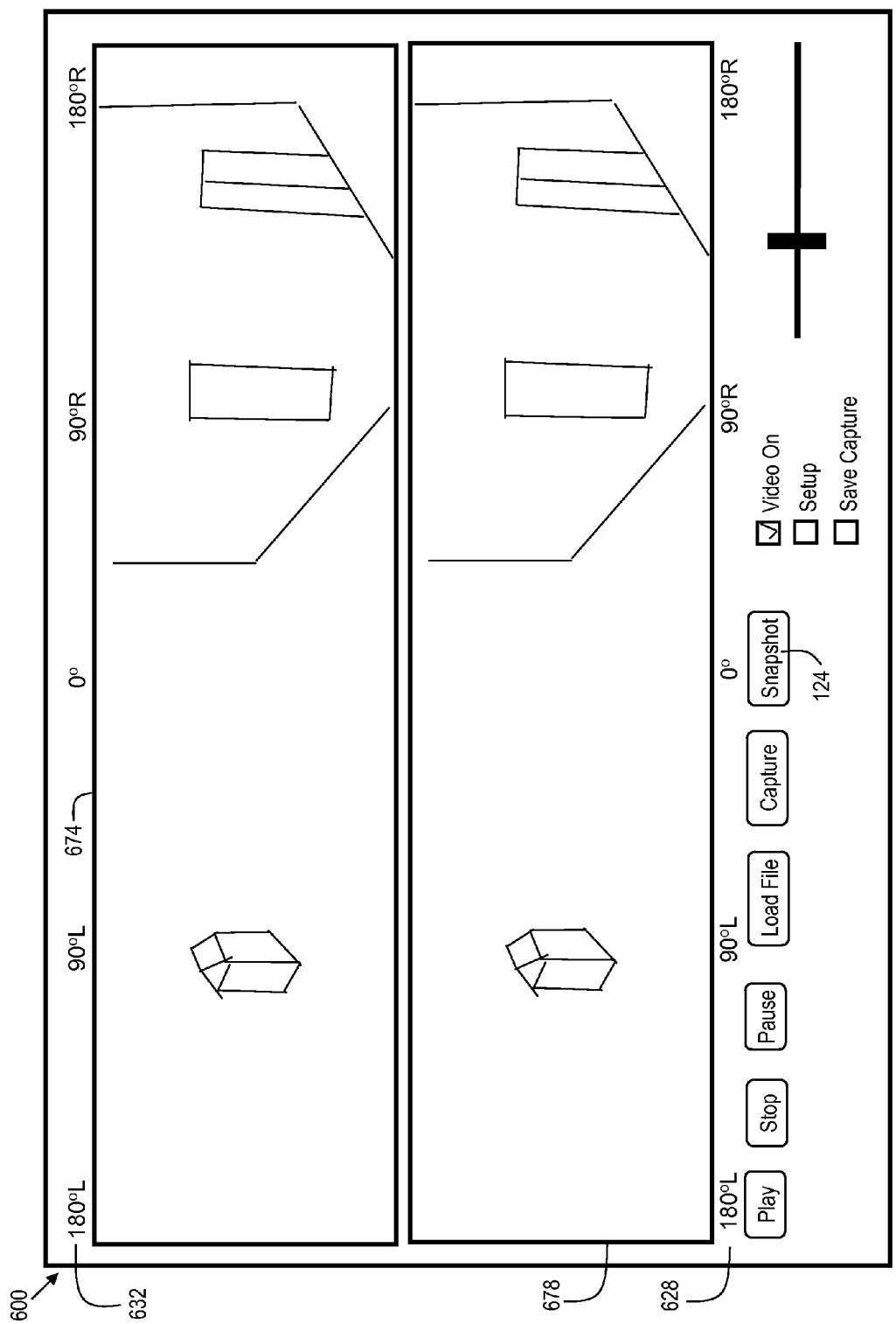
FIG. 6 shows an embodiment with a dual rectangular video view.

FIG. 6 shows an additional view 600 of the present invention during the surveillance process. In this case a dual rectangular video view is used. In this embodiment, the lower rectangular video view 678 displays live video, and the upper rectangular video view 674 is used for displaying a still image that was extracted from the live video when the snapshot control 124 is invoked. Degree indicator 632 provides orientation information for the upper rectangular video view 674. Degree indicator 628 provides orientation information for the upper rectangular video view 678.

Figure 7:
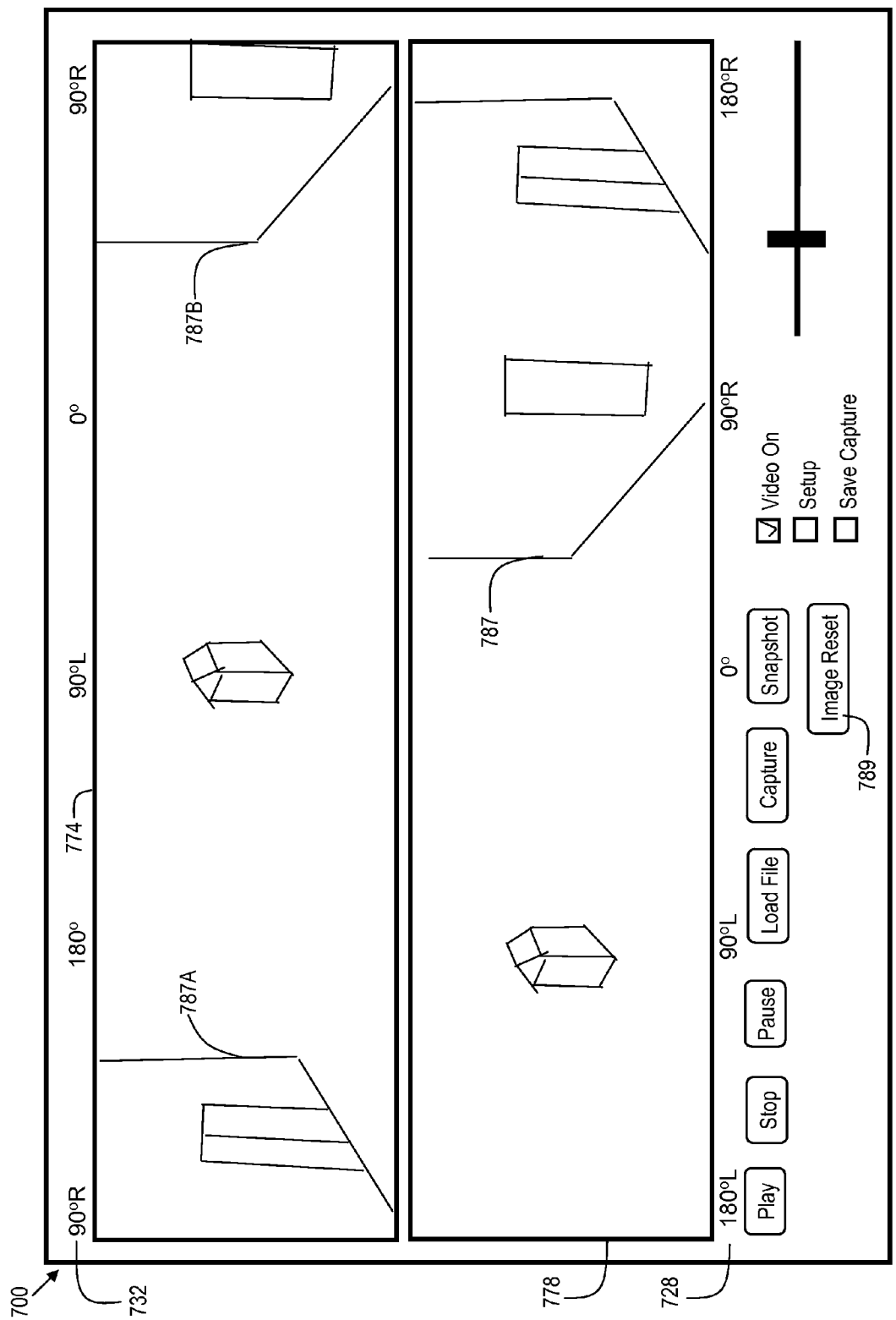
FIG. 7 shows an alternative embodiment with a dual rectangular video view.

FIG. 7 shows an additional view 700 of the present invention during the surveillance process. In this case a dual rectangular video view is used. In this embodiment, the upper rectangular video view 774 shows a shifted image of the video (an image of the video with a positional shift applied thereto), as indicated by degree indicator 732, and the lower rectangular video view 778 shows a non-shifted image of the video, as indicated by degree indicator 728. In one embodiment, the upper view is shifted simply by selecting a point in upper rectangular video view 774 and dragging it with the mouse (or other human interface device) to select a desired angular setting. In this case, the video shown in the upper rectangular video view 774 and the lower rectangular video view 778 are showing live video from the same capture device. However, it is also possible to use a video view to display a previously captured video file (captured by invoking the save capture function—see 122 of FIG. 1) or still image (captured by invoking the snapshot function—see 124 of FIG. 1), and perform similar horizontal manipulation to place the area of interest in the center of the view window. A preferred embodiment of the present invention also provides a magnification function, allowing the user to zoom in on a desired area of the video or still image.

One reason for shifting is to bring a desired object into the center of the rectangular video view (774, 778). Another reason for shifting is to allow an object to be displayed contiguously on the rectangular screen. In this example, an object is shown as two parts (787A and 787B) in the upper rectangular video view 774, while that same object (indicated as 787) is shown contiguously in lower rectangular video view 778. The shifting allows surveillance personnel to arrange views which allow important surveillance areas to be viewed contiguously. The Image Reset button 789 is configured to reset the positional shift value to zero, thereby serving to quickly and conveniently restore a shifted image to its default angular setting that was in effect when the image was originally captured.

Figure 8:
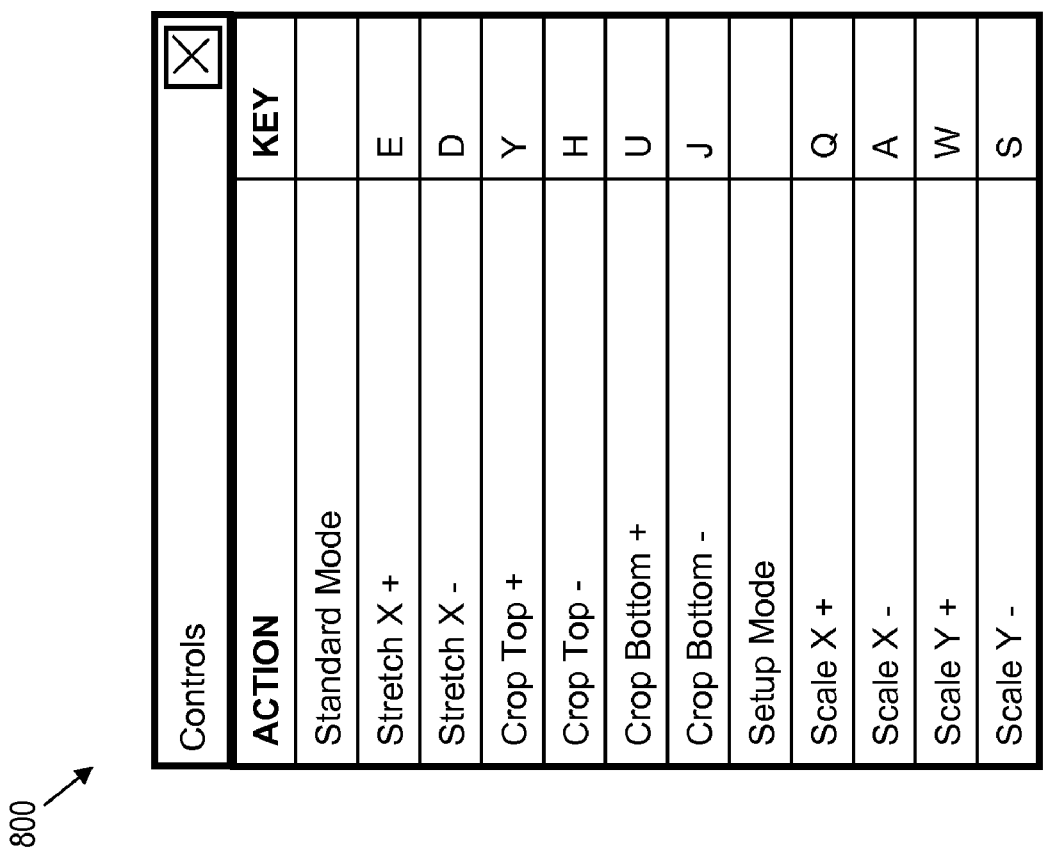
FIG. 8 shows an exemplary embodiment of image manipulation controls provided by the present invention.

FIG. 8 shows a preferred embodiment of an image manipulation control menu. In this embodiment, various image manipulation functions are contemplated. The image manipulation functions may include, but are not limited to, scaling of the X axis and Y axis, and cropping controls for the top and bottom of a video clip or still image. It is also contemplated to provide a stretch control for the X axis. It is contemplated that the control may be invoked by clicking on the desired feature with a mouse or other pointing device, or alternatively controlled via a hot key on the keyboard. For example, in the embodiment shown, the hot key for "Scale X +" is "Q". These image manipulation controls allow for the elimination of any unnecessary portions that are not wanted, as well as to compensate for certain types of reflectors that are part of a panoramic camera system.

Figure 9:
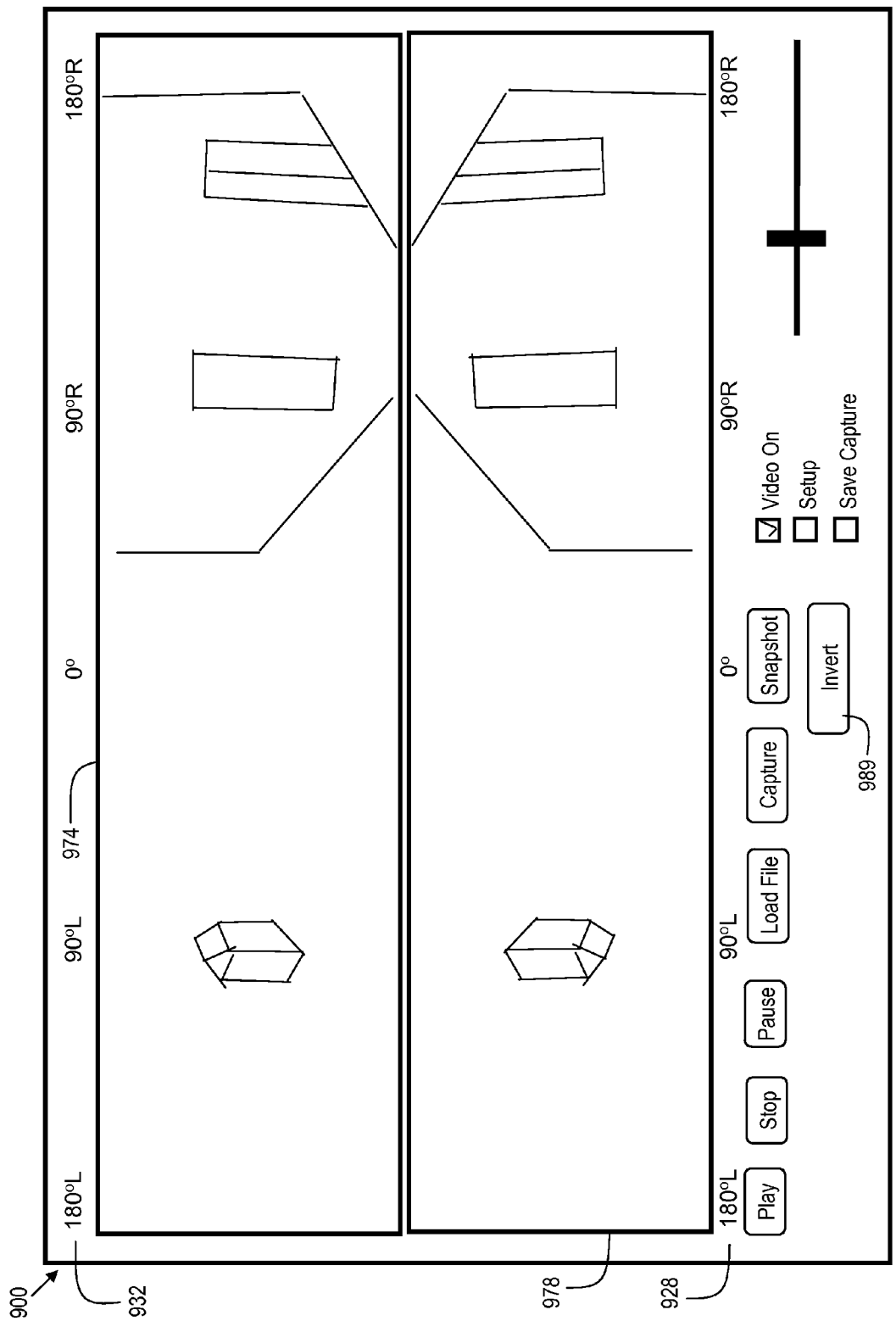
FIG. 9 shows an alternative embodiment with an invert control.

FIG. 9 shows an additional view 900 of the present invention during the surveillance process. Similar to the embodiment shown in FIG. 7, a dual rectangular video view is used. In this embodiment, the upper rectangular video view 974 shows an "inverted" image of the video, as compared with the lower rectangular video view 978 which shows a non-inverted image of the video. In one embodiment, the Invert button 989 provides the user with the capability to activate the invert function. The invert function comprises flipping the image about its horizontal axis, and is a convenient feature for rectifying images captured from an inverted camera.

Figure 10:
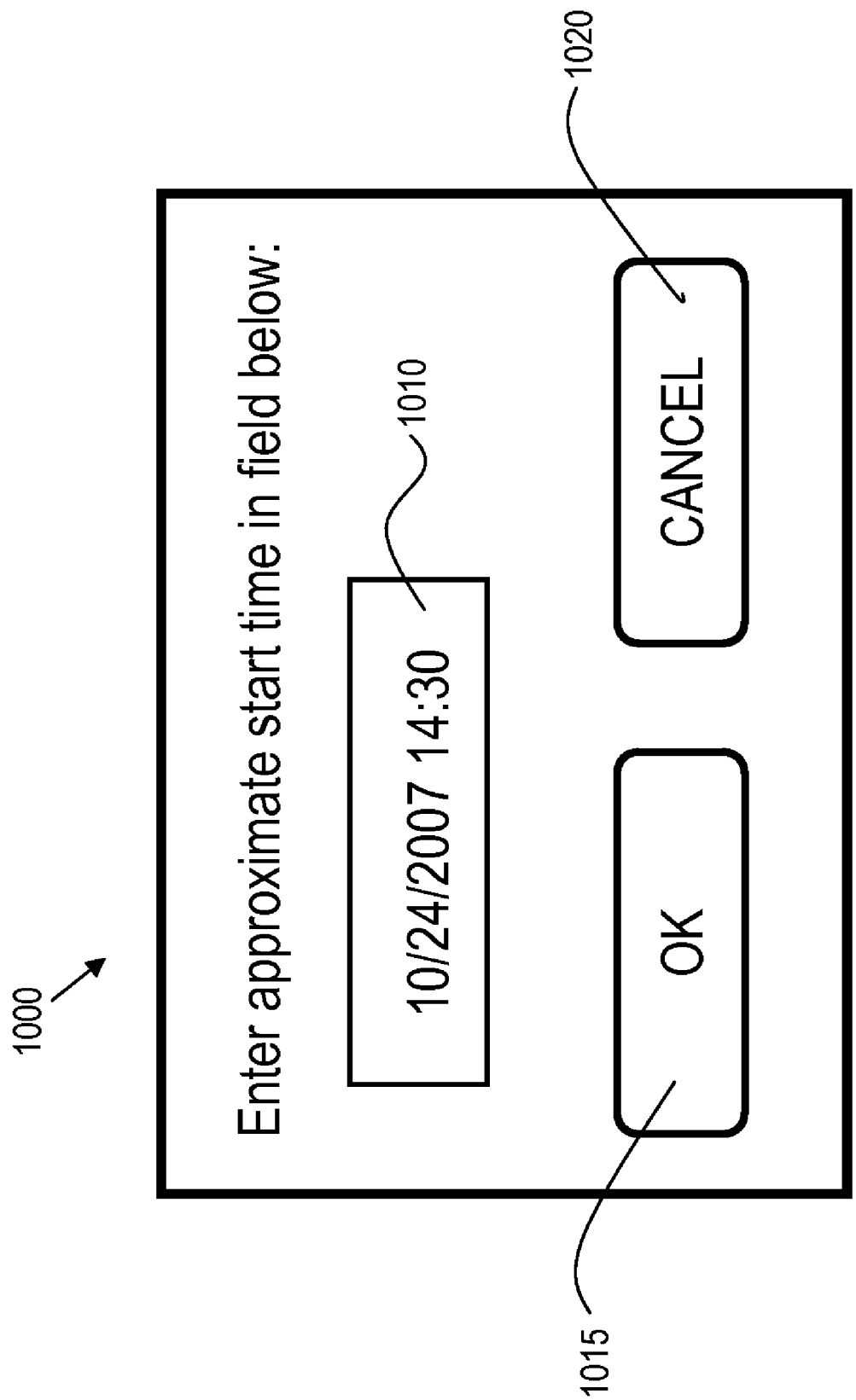
FIG. 10 shows a user interface for video archive retrieval.

FIG. 10 shows an additional view 1000 of the present invention during the video archive retrieval process. This view shows a dialog box that is preferably invoked via a menu option or hot-key combination. In the embodiment shown, the user enters a desired viewing time for the video he or she wishes to view in data entry field 1010. The user then confirms the selection via the OK button 1015. Alternatively, the operation may be canceled via the Cancel button 1020.

Figure 11:
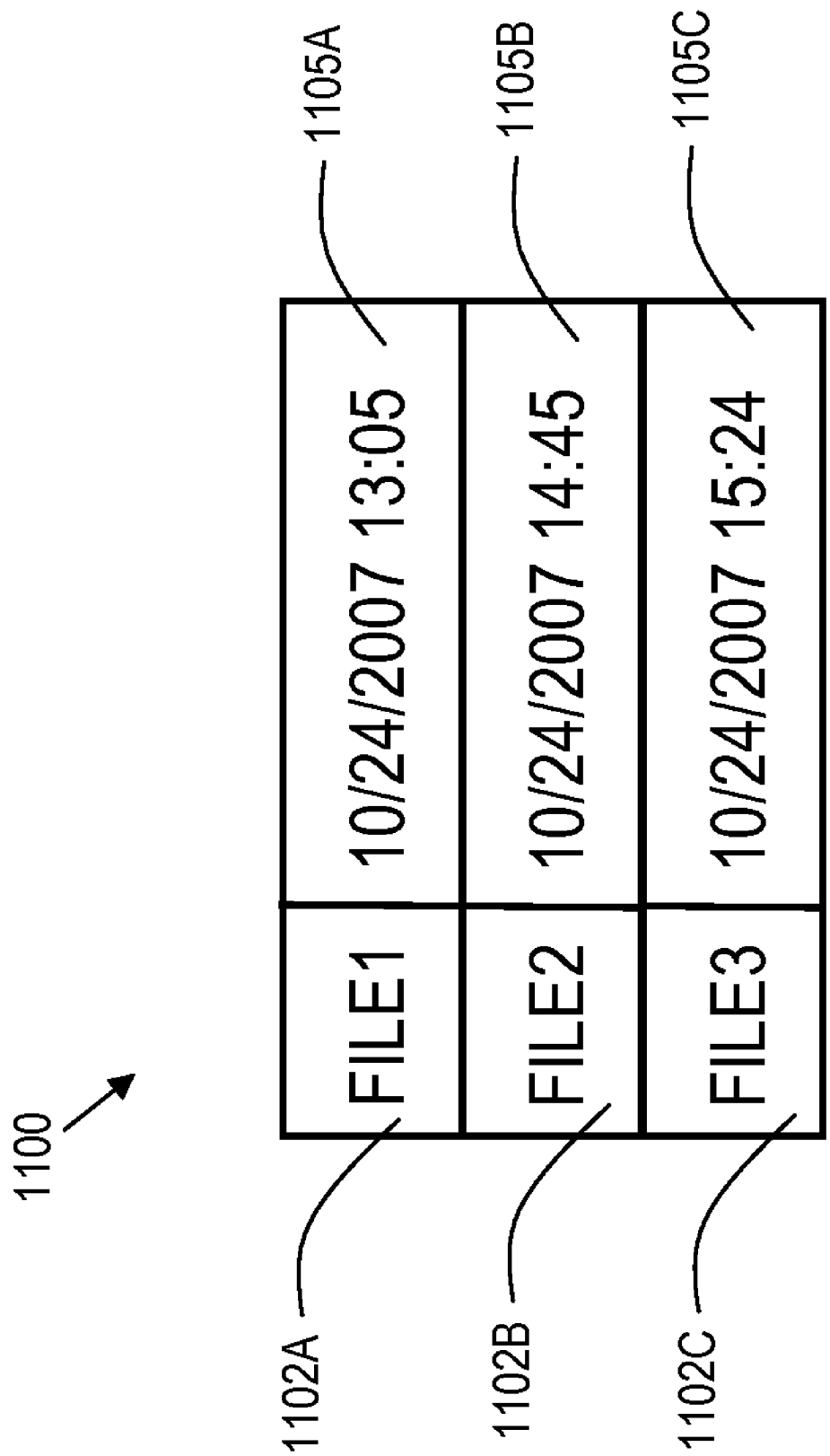
FIG. 11 shows a tabular representation of data.

FIG. 11 shows a tabular representation 1100 of a sample set of video archives. The data shown herein may be stored in computer memory via a database or other memory structures as is known in the art. In this embodiment, a plurality of temporally sorted capture files archive the stored video. A file handle (1102A-1102C) and an ending timestamp (1105A-1105C) are maintained for each archived file. In the example in FIG. 10, the user entered a date of 10/24/2007 and time of 14:30. The system of the present invention scans the information contained in table 1100 to identify the file having the ending time closest to the user-entered date and time, and also later than the desired viewing time. In the example illustrated in FIG. 10, this criterion is satisfied by the file having file handle 1102B, which has date field 1105B containing a date of 10/24/2007 and a time of 14:45. In this way, the appropriate video archive file may be quickly retrieved for viewing.

Figure 12A:
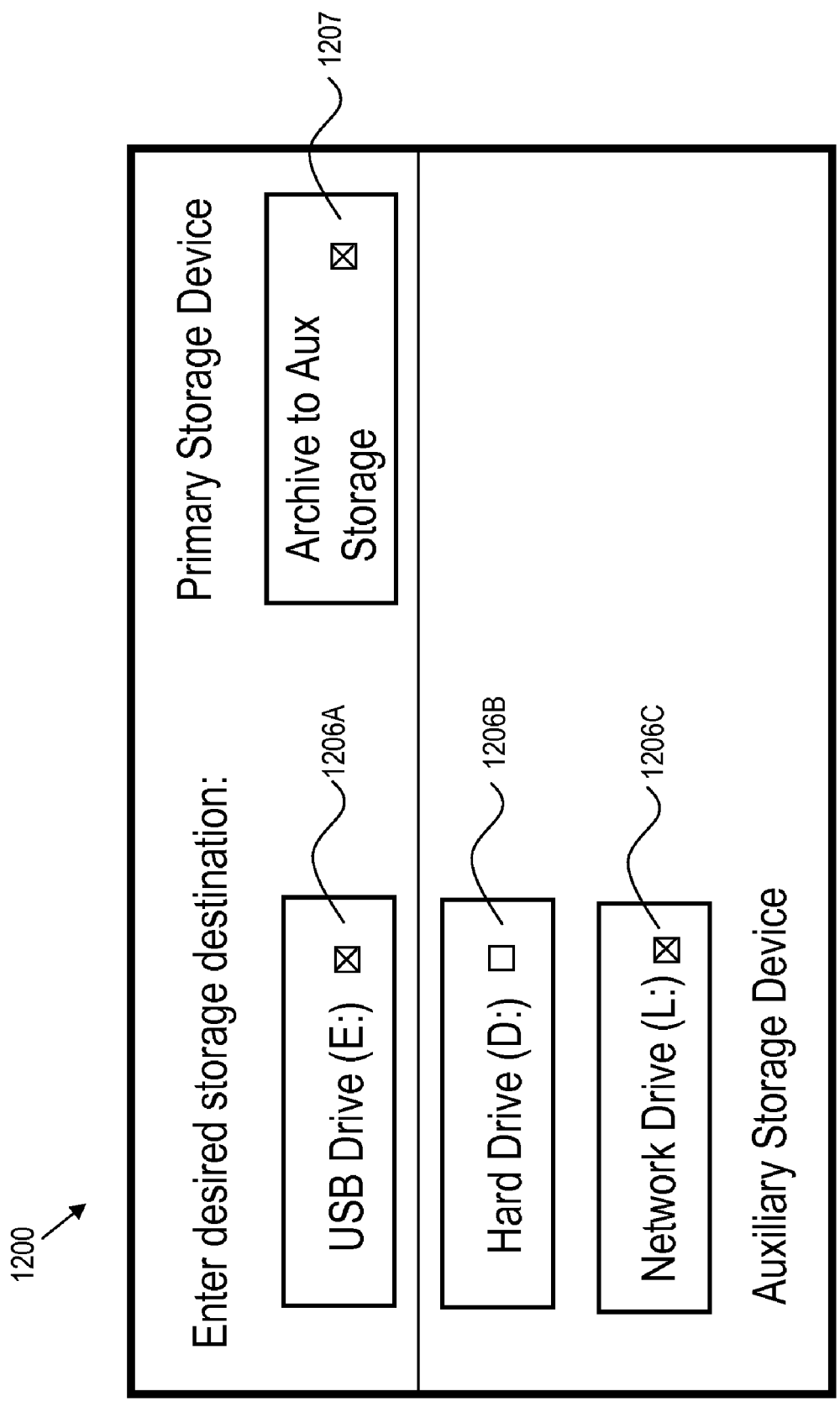
FIG. 12A shows a user interface for selecting a storage destination.

FIG. 12A shows an additional view 1200 of the present invention during the video archive retrieval process. This view shows a dialog box that is preferably invoked via a menu option or hot-key combination. In the embodiment shown, the user selects the desired storage destination(s) for the video he or she wishes to save. In the embodiment shown, three checkbox fields (1206A-1206C) are shown. 1206A is designated as a primary storage device. Configuration option "Archive to Aux storage" 1207 is also enabled. By enabling this option, the stored data is transferred to the auxiliary storage (in this example, network drive control 1206C is enabled) before data on the primary storage device (USB Drive) is overwritten.

Figure 12B:
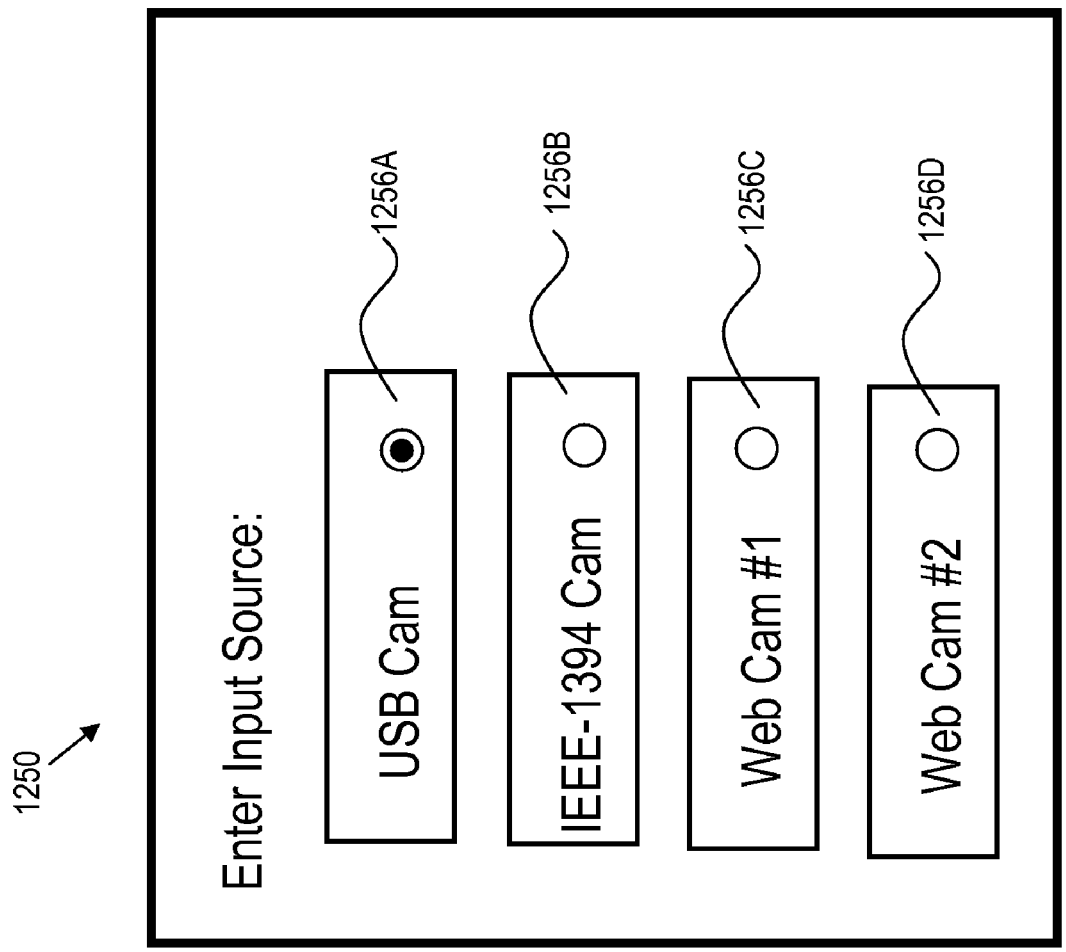
FIG. 12B shows a user interface for selecting an input source.

FIG. 12B shows an additional view 1250 of the present invention during the video archive retrieval process. This view shows a dialog box that is preferably invoked via a menu option or hot-key combination. In the embodiment shown, the user selects the desired input source for the surveillance video he or she wishes to monitor. In the embodiment shown, a plurality of source radio button fields (1256A-1256D) are shown. In this example, field 1256A is selected, indicating that the video source is coming from a USB camera. Buttons 1256C and 1256D are used for retrieving video from network sources (i.e., cameras that deliver video over a computer network, such as the Internet or other IP network, for example).

FIG. 12C shows an additional view 1270 of the present invention during the video archive retrieval process. This view shows a dialog box that is preferably invoked via a menu option or hot-key combination. In the embodiment shown, the user can control the camera housing position via the UP button 1275A and DOWN button 1275B. In this way, the housing can be retracted to a safe position when not in use, or to facilitate cleaning or maintenance of the housing.

Figure 13:
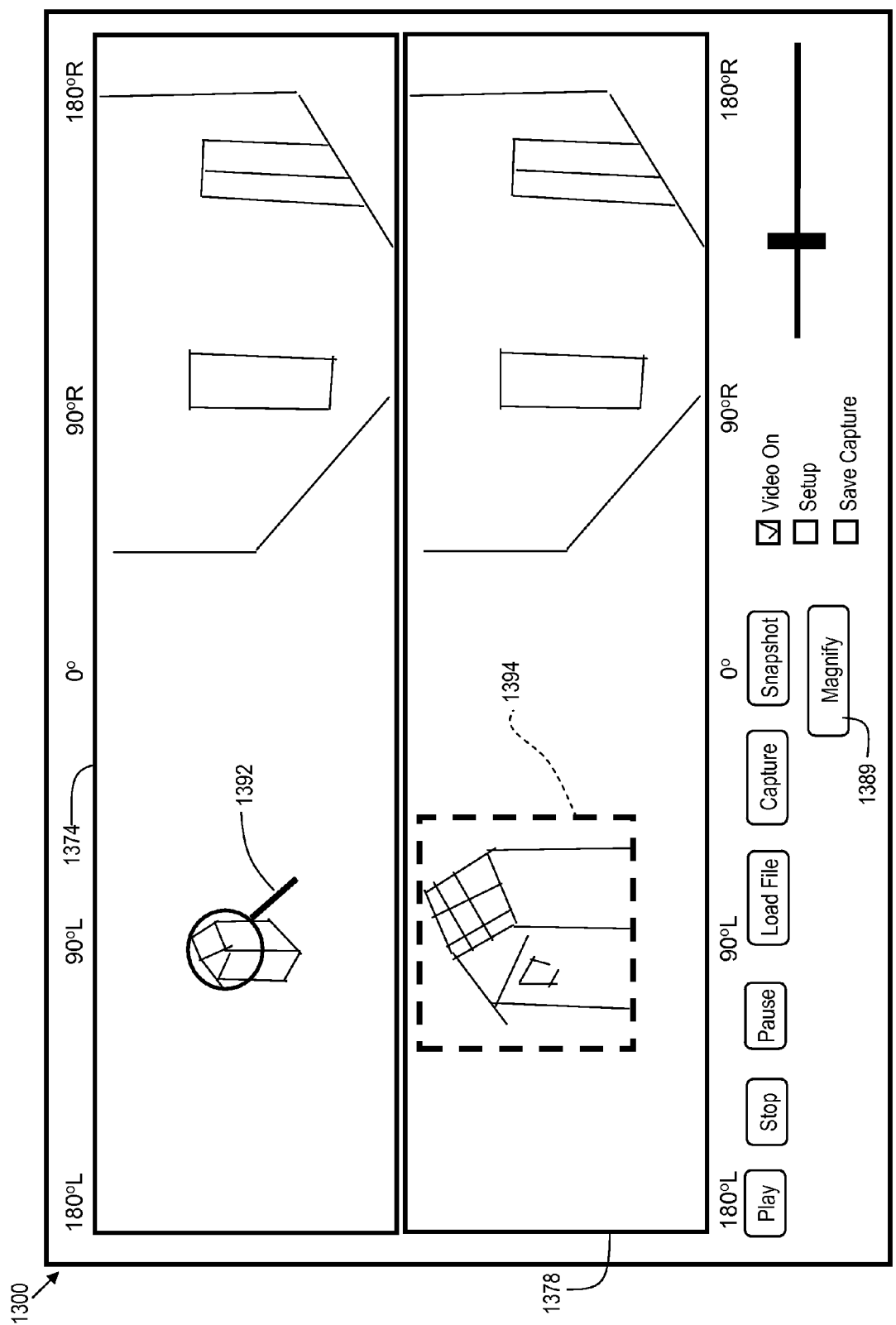
FIG. 13 shows an alternative embodiment with a magnification control.

FIG. 13 shows an additional view 1300 of the present invention during the surveillance process. Similar to the embodiment shown in FIG. 7, a dual rectangular video view is used. In this embodiment, the upper rectangular video view 1374 shows a normal image of the video. By invoking the magnify button 1389, a magnify cursor 1392 is activated, and may be placed anywhere over view 1374 via mouse control, or other human interface device. The lower view 1378 shows a magnified portion 1394 that shows the area covered by magnify cursor 1392 in greater detail. This allows a user to get a closer look at an area or subject of interest within the surveillance video.

Figure 14:
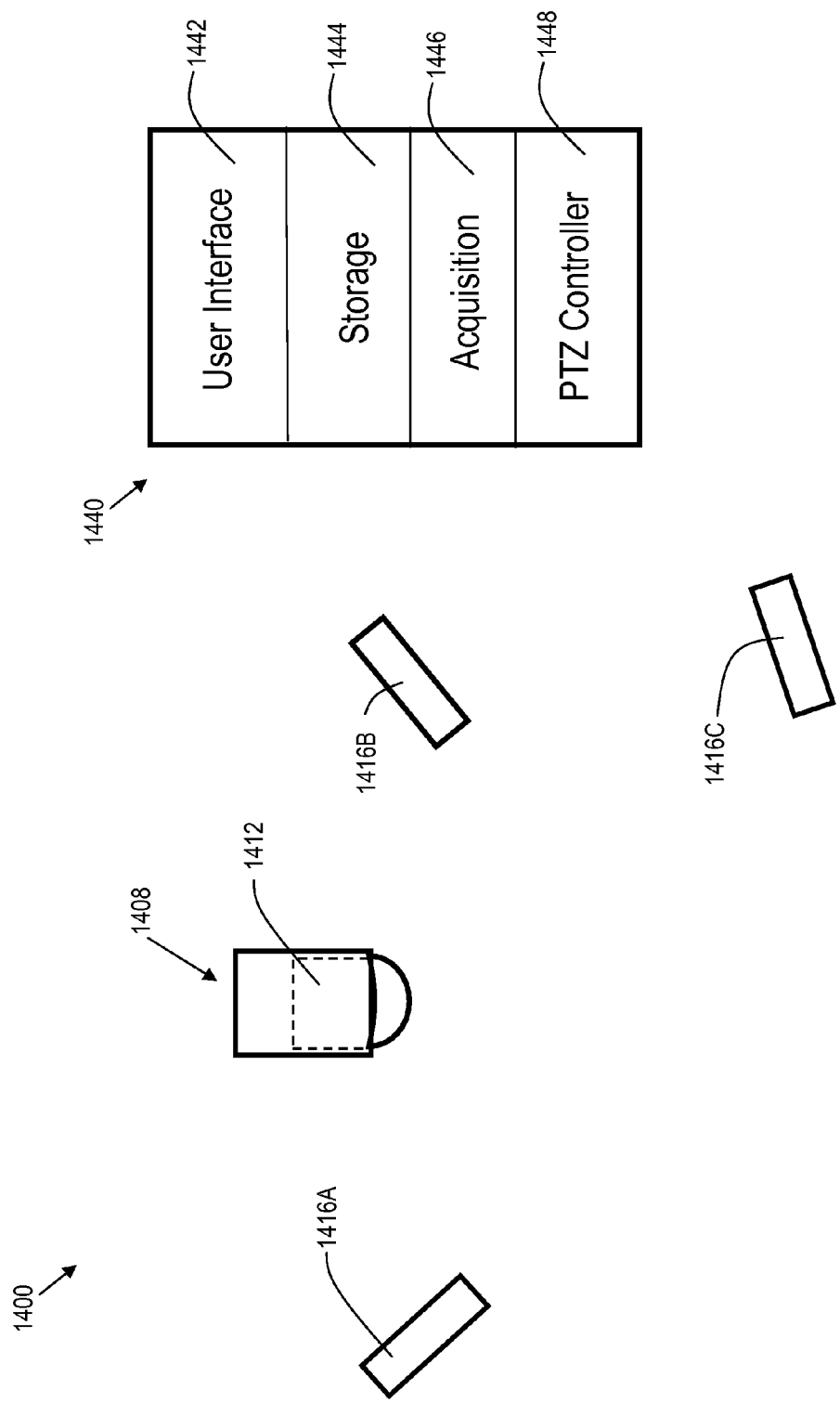
FIG. 14 shows an alternative embodiment providing for panoramic and conventional camera images.

FIG. 14 shows an exemplary embodiment of a system in accordance with the present invention. The system comprises computer system 1440 having a user interface 1442, storage module 1444, acquisition module 1446, and Pan Tilt Zoom (PTZ) controller 1448. The surveillance cameras include panoramic camera 1408 having retractable photochromic housing 1412. Additionally, three conventional cameras 1416A-1416C also provide surveillance. The conventional cameras 1416A-1416C, and panoramic camera 1408 provide video to the acquisition module 1446. Various acquisition modules are commercially available. One such acquisition module is the Avermedia NV6240-Exp, distributed by Avermedia, of Milpitas, Calif. The acquisition module saves the video in storage module 1444. Storage module 1444 is preferably implemented as one or more hard disks, solid state memory arrays, or other suitable non-volatile storage means. Conventional cameras 1416A-1416C are preferably mounted on motor controlled adjustable mounts that provide pan and tilt control, when configured to communicate with PTZ controller 1448. PTZ controller 1448 calculates angular information (i.e. the angle each conventional camera must be positioned to, in order to focus on the area of interest) based on the area of interest within the dewarped video captured from the 360 degree panoramic video camera. This angular information is applied to the adjustable camera mount of each conventional camera with the system. Conventional cameras that comprise integrated adjustable camera mounts are well suited for this purpose, and are commercially available from various sources. One such conventional camera is the Sanyo VCC-P9574S, available from Sanyo Corporation, of Osaka, Japan. Conventional cameras 1416A-1416C preferably have zoom control that is responsive to a signal from the PTZ controller 1448. In this way, computer system 1440 can coordinate the images from both the panoramic cameras and the conventional cameras.

Figure 15:
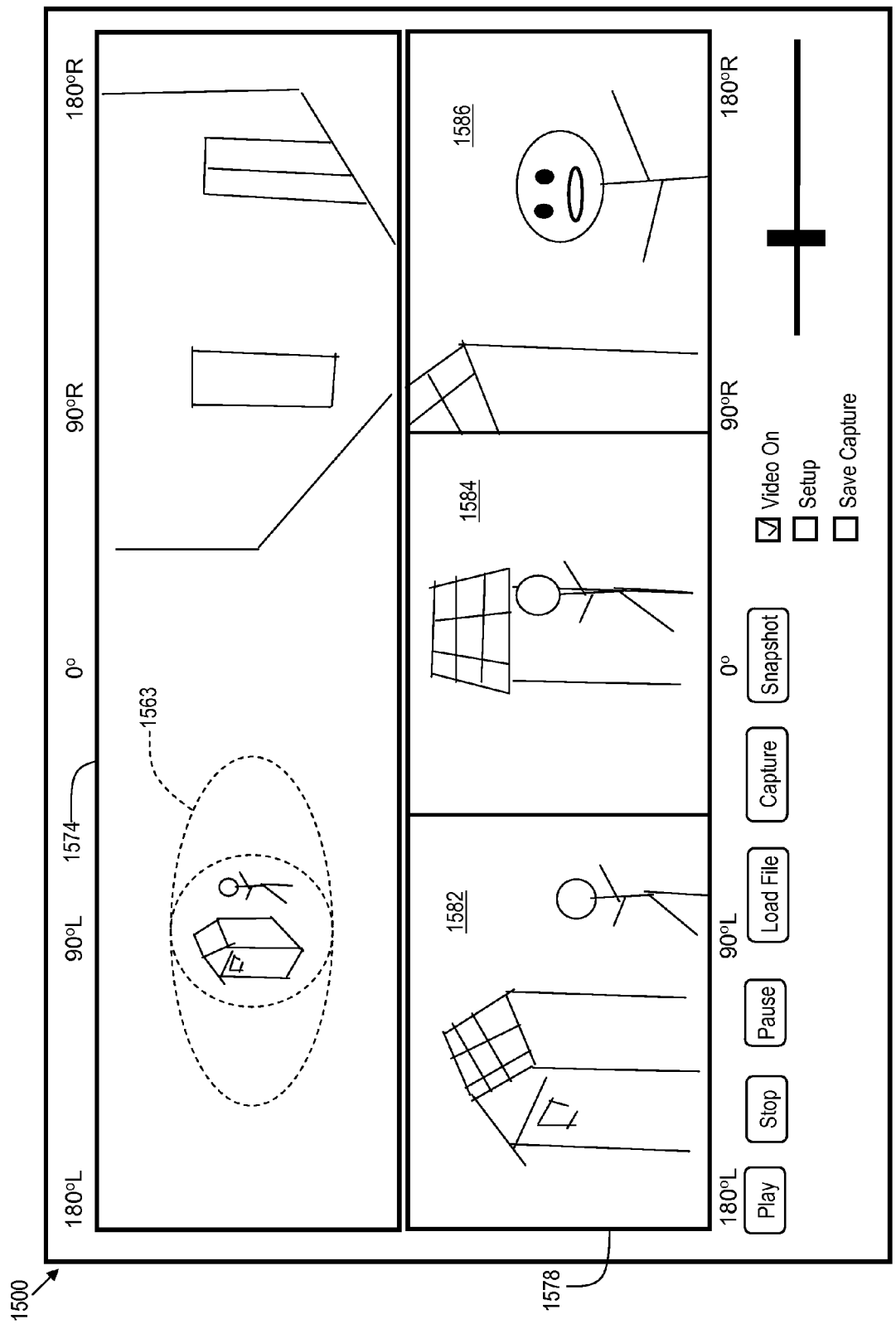
FIG. 15 shows a surveillance system in accordance with the present invention.

FIG. 15 shows an additional view 1500 of the present invention during the surveillance process. In this embodiment, the upper rectangular video view 1574 shows a normal image of the video. By invoking a menu function, an "eye" cursor 1563 is activated, and may be placed anywhere over view 1574 via mouse control, or other human interface device. When the user places eye cursor 1563 over the desired area and indicates (e.g. via a mouse click) a desire for a close inspection, messages are sent to a plurality of conventional cameras to focus on that area. The angle information from the upper rectangular video view 1574 is communicated to a Pan Tilt Zoom (PTZ) controller (1448 of FIG. 14) configured to communicate with conventional cameras. The PTZ controller computes the angles needed to aim each regular camera at the point of interest. The conventional cameras are then aimed and focused on the point of interest. In FIG. 15, three conventional camera images (1582, 1584, and 1586) are simultaneously shown below the upper rectangular video view 1574. In this way, additional detail from multiple cameras may be readily obtained by the user as the situation warrants.

Figure 16A:
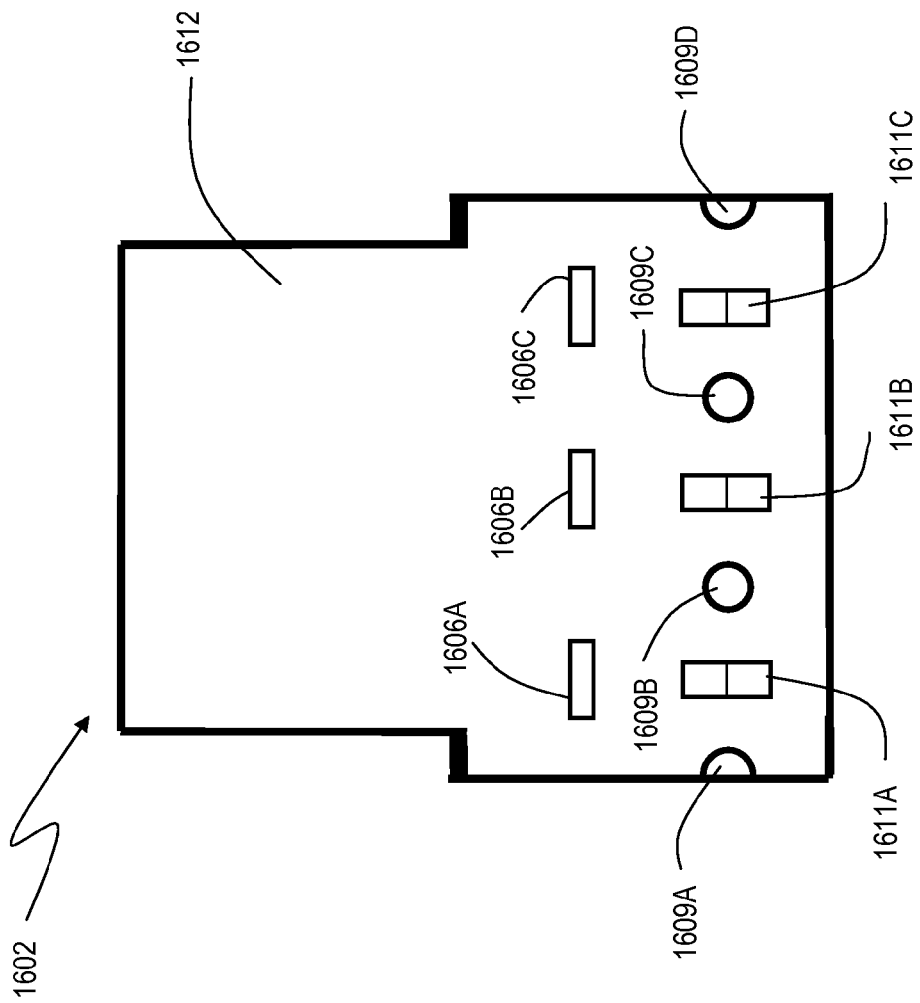
FIGS. 16A and 16B show an alternative embodiment of a panoramic camera of a surveillance system in accordance with the present invention.
Figure 16B:
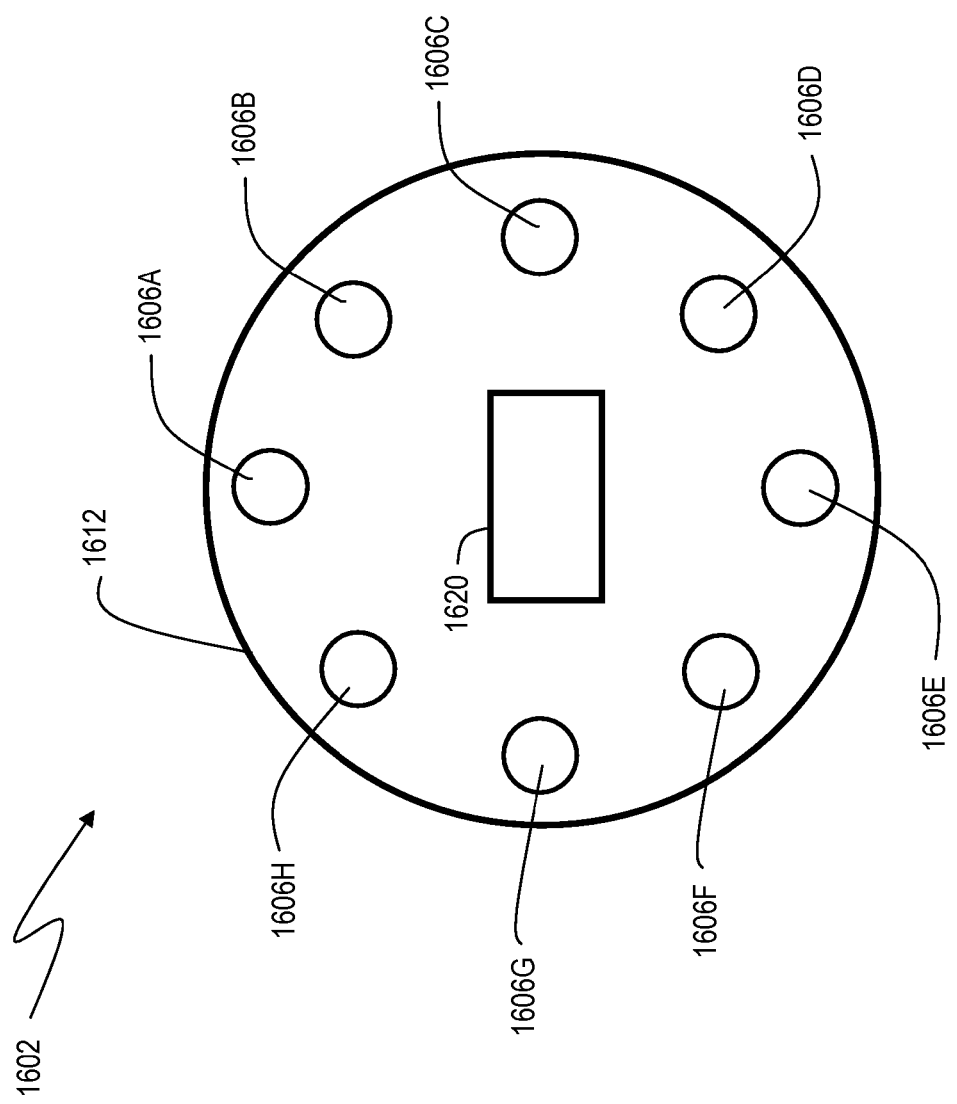

FIGS. 16A and 16B show an alternative embodiment of a panoramic camera 1602 of a surveillance system in accordance with the present invention. Referring now to FIG. 16A, a side view of panoramic camera 1602 is shown. Panoramic camera 1602 has photochromic housing 1612. Around the exterior of camera 1602 are a plurality of UV (ultraviolet) lights 1606A-1606C that are controllable in intensity, and are directed at photochromic housing 1612. This enables the photochromic housing 1612 to be darkened in a particular direction as needed, providing additional control of the photochromic properties. Camera 1602 further comprises a plurality of IR (infrared) light sources 1609A-1609D that emit infrared light towards the scenes that camera 1602 captures. Camera 1602 further comprises a plurality of light sensor modules 1611A-1611C. Each sensor module 1611 preferably comprises an infrared light sensor, and a visible light sensor. Each sensor is configured and disposed to trigger an activation of a corresponding UV light source 1606 when excess light (either infrared or visible) is detected.

In the case of visible light, it is desirable to have the photochromic material adjust as quickly as possible. This embodiment provides a means to accelerate the photochromic transition of the photochromic material to the darkened state.

In the case of infrared light, it will not activate a photochromic material, and so it is necessary to have a means of exposure control, whereby it is possible to compensate for intense IR light entering the camera 1602 from a given direction. For example, if sensor 1611B detects a level of incoming IR light that exceeds a predetermined threshold, then UV light source 1606B is activated, causing the housing 1612 to darken in that area, thereby maintaining adequate control of the exposure of the camera 1602. Note that the UV light sources 1606, infrared sensors 1611, and infrared light sources 1609 extend around the circumference of the camera 1602, and only a subset of these are visible in the side view of FIG. 16A. Note that camera 1602 is well suited for night operation, since the IR light sources 1609 illuminate outward from the camera 1602, thereby facilitating night operation of the camera 1602. The present invention also provides the aforementioned exposure control method that allows for improved images in night operation.

FIG. 16B shows a top-down view of the camera 1602, indicating the plurality of UV light sources 1606A-1606H, and image capture element 1620. Note that due to manufacturing variation amongst photochromic material used for housing 1612, it is desirable to provide an adjustable trigger point that determines how much incoming light (visible or IR) is needed to activate the UV light source, to allow for control when the UV light sources 1606 will be activated to accelerate the darkening of the photochromic housing 1612.

Figure 17:
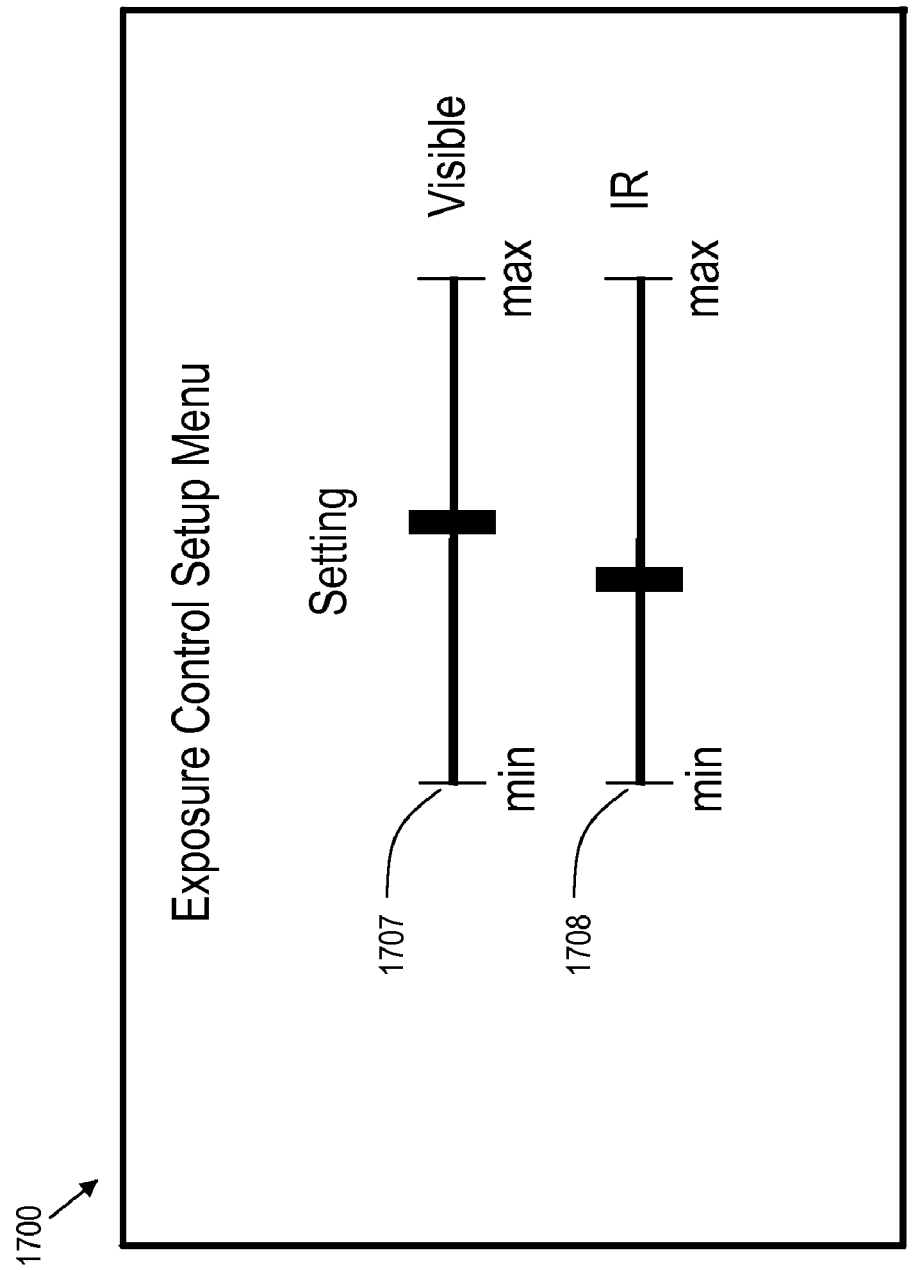
FIG. 17 shows an exemplary exposure control setup menu for controlling the exposure of the panoramic camera of FIGS. 16A and 16B.

FIG. 17 shows a portion of an exemplary exposure control setup menu 1700. In this embodiment, two controls 1707 and 1708 are shown. Control 1707 is used to adjust the sensor trigger point for the visible light sensor within sensor module 1611. Control 1708 is used to adjust the sensor activation point for the infrared (IR) sensor within sensor module 1611. The settings of controls 1707 and 1708 correspond to a particular sensor trigger point that is used to activate a UV light source 1606 of FIG. 16B. When a particular sensor module 1611 triggers, either due to incoming visible light, or due to incoming IR, the corresponding UV light source triggers, thereby accelerating the darkening of the photochromic material corresponding to the direction from which the visible light or IR came. In one embodiment, a timer mechanism shuts off the UV lamp a predetermined time after it activates. This timing mechanism is reset once the light level falls below the predetermined threshold (trigger point) set by the controls of exposure control setup menu 1700. For example, the UV light sources 1606 may be configured to shut off automatically 3 minutes after activation, since once the photochromic material has reached its darkened state, it is not necessary to continue using the UV light sources 1606. Once the received light falls below the predetermined threshold, the mechanism is reset, and the corresponding UV lights 1606 will activate once the corresponding sensor modules 1611 detect that the light level has exceeded the predetermined threshold once again. Note that two sensors per sensor module 1611 are described in the aforementioned example, a visible light sensor, and an IR light sensor. However, it is also possible to practice the present invention with multiple visible light sensors, where a subset of the light sensors are set to a lower trigger point for indoor use, and another subset of the light sensors are set to a higher trigger point for outdoor use. This allows the camera 1602 to quickly be configured for either indoor or outdoor use.

Although the description above contains many specific details, these should not be construed as limiting the scope of the invention, but merely as providing illustrations of some of the presently preferred embodiments of the present invention.

What is claimed is:

1. A system for displaying video from a 360 degree panoramic video camera that comprises a convex reflector and an image capture element, comprising:
   a first display window showing the video from the 360 degree panoramic video camera in a circular video view;
   means for converting the video from the circular video view into a rectangular format;
   a second display window showing the video from the 360 degree panoramic video camera in a rectangular video view;
   means for indicating an offset between the center of the convex reflector, and the center of the image capture element; and
   means for reconverting the video from the circular video view into rectangular format based on said offset, thereby providing a dewarped rectangular video view.

2. The system of claim 1, further comprising:
   means for establishing a positional shift; and
   a third display window, wherein said third display window displays the video from the second display window with the positional shift applied thereto.

3. The system of claim 2, wherein the means for establishing the positional shift comprises moving the video in the third display window to a desired positional shift via a pointing device.

4. The system of claim 3, further comprising:
   means for resetting the positional shift to zero; and
   means for displaying the video in the third display window with the positional shift of zero.

5. The system of claim 4, further comprising means for inverting the video in the third display window.

6. The system of claim 5, further comprising means for archiving video in a plurality of temporally sorted capture files.

7. The system of claim 6, further comprising means of retrieving a capture file based on a user-entered date and time.

8. The system of claim 2, further comprising means for magnifying a portion of the rectangular video view.

9. The system of claim 2, further comprising means for aiming a plurality of conventional cameras at a location indicated by coordinates on the rectangular video view.

10. The system of claim 9, wherein the means for aiming a plurality of conventional cameras at a location indicated by a position on the rectangular video view comprises:
    a plurality of conventional cameras, each conventional camera comprising a controllable, angularly adjustable camera mount;
    a user interface configured to indicate the position on the rectangular video view; and
    a PTZ controller, configured to receive the position from the user interface, calculate angular information for each conventional camera, and transmit said angular information to each camera mount.

11. The system of claim 10, further comprising means for displaying images from the plurality of conventional cameras simultaneously with the rectangular video view.

12. The system of claim 1, wherein the 360 degree panoramic video camera further comprises a retractable housing, and means for extending and retracting said housing.

13. The system of claim 2, further comprising means for creating and saving a still image from the rectangular video view.

14. The system of claim 2, further comprising means for selecting an input source for the 360 degree panoramic video camera, wherein the input source is selected from the group consisting of USB, IEEE-1394, and network.

15. A method of calibrating a 360 degree panoramic video camera that comprises a convex reflector and an image capture element, comprising the steps of:
    positioning a cursor to a desired position on a user interface; and
    selecting a desired position via pressing a button on a pointing device;
    wherein the desired position is indicative of an offset between the center of the convex reflector, and the center of the image capture element;
    storing said offset in a non-volatile storage location; and
    reconverting the video from a circular video view into rectangular format based on said offset.

* * * * *